(12) United States Patent
Jung

(10) Patent No.: US 11,789,501 B2
(45) Date of Patent: Oct. 17, 2023

(54) ELECTRONIC DEVICE INCLUDING DISPLAY WITH OPENING HAVING SHAPE DIFFERENT FROM THAT OF SENSOR

(71) Applicant: Samsung Electronics Co., Ltd., Suwon-si (KR)

(72) Inventor: Hunjo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 17/431,594

(22) PCT Filed: Feb. 19, 2020

(86) PCT No.: PCT/KR2020/002385
§ 371 (c)(1),
(2) Date: Aug. 17, 2021

(87) PCT Pub. No.: WO2020/171585
PCT Pub. Date: Aug. 27, 2020

(65) Prior Publication Data
US 2022/0137677 A1    May 5, 2022

(30) Foreign Application Priority Data
Feb. 19, 2019    (KR) .................. 10-2019-0019556

(51) Int. Cl.
G06F 1/16    (2006.01)
(52) U.S. Cl.
CPC .......... G06F 1/1684 (2013.01); G06F 1/1652 (2013.01); G06F 1/1658 (2013.01)

(58) Field of Classification Search
CPC ..... G06F 1/1652; G06F 1/1684; G06F 1/1658
See application file for complete search history.

(56) References Cited

U.S. PATENT DOCUMENTS

| 9,506,802 | B2 | 11/2016 | Chu et al. |
| 9,983,027 | B2 | 5/2018 | Ruh |
| 10,198,611 | B2* | 2/2019 | Evans, V .......... G02F 1/133606 |
| 10,296,777 | B2* | 5/2019 | Du .......................... H10K 59/12 |
| 10,409,099 | B2* | 9/2019 | Hsiao ................. G06V 40/1318 |
| 10,607,057 | B2 | 3/2020 | Kwon et al. |
| 10,691,914 | B2* | 6/2020 | Ting ................... G06V 40/1318 |

(Continued)

FOREIGN PATENT DOCUMENTS

| KR | 10-2017-0051854 A | 5/2017 |
| KR | 10-2017-0087635 A | 7/2017 |

(Continued)

OTHER PUBLICATIONS

Extended European Search Report dated Mar. 10, 2022, issued in European Patent Application No. 20758962.3-1216.

*Primary Examiner* — Adrian S Wilson
(74) *Attorney, Agent, or Firm* — Jefferson IP Law, LLP

(57) ABSTRACT

An electronic device is provided. The electronic device comprise a housing including a first face and a second face facing the first face to construct a space, a sensor module disposed to the space and including a first sensor facing the first face, a display disposed on the sensor module, and a protective sheet disposed to one face of the display and constructing a first opening having a shape different from that of the first sensor at a location corresponding to the first sensor of the sensor module.

18 Claims, 21 Drawing Sheets

(56) References Cited

U.S. PATENT DOCUMENTS

| | | | | |
|---|---|---|---|---|
| 10,820,421 B2* | 10/2020 | Huang | ................. | H05K 1/0281 |
| 11,088,344 B2* | 8/2021 | Kwak | ................. | H10K 50/8426 |
| 11,243,562 B2* | 2/2022 | Kim | ......................... | G06F 1/16 |
| 11,449,179 B2* | 9/2022 | Shin | ....................... | G06F 1/1641 |
| 2017/0123461 A1 | 5/2017 | Kim et al. | | |
| 2017/0212613 A1 | 7/2017 | Hwang et al. | | |
| 2017/0287992 A1 | 10/2017 | Kwak et al. | | |
| 2018/0151641 A1 | 5/2018 | Choo et al. | | |
| 2018/0203562 A1 | 7/2018 | An et al. | | |
| 2018/0293420 A1 | 10/2018 | Kim et al. | | |
| 2018/0321552 A1 | 11/2018 | Sugihara et al. | | |
| 2019/0303640 A1 | 10/2019 | Song et al. | | |
| 2019/0363277 A1* | 11/2019 | Kwak | ................. | H10K 50/841 |
| 2020/0057467 A1* | 2/2020 | Kim | ........................ | G06F 1/203 |

FOREIGN PATENT DOCUMENTS

| | | |
|---|---|---|
| KR | 10-1796660 B1 | 11/2017 |
| KR | 10-2018-0083737 A | 7/2018 |
| WO | 2018/155851 A1 | 8/2018 |
| WO | 2018/228269 A1 | 12/2018 |

\* cited by examiner

ELECTRONIC DEVICE INCLUDING DISPLAY WITH OPENING HAVING SHAPE DIFFERENT FROM THAT OF SENSOR

CROSS-REFERENCE TO RELATED APPLICATION(S)

This application is a U.S. National Stage application under 35 U.S.C. § 371 of an International application number PCT/KR2020/002385, filed on Feb. 19, 2020, which is based on and claimed priority of a Korean patent application number 10-2019-0019556, filed on Feb. 19, 2019, in the Korean Intellectual Property Office, the disclosure of which is incorporated by reference herein in its entirety.

BACKGROUND

1. Field

The disclosure relates to an electronic device including a display with an opening having a shape different from that of a sensor.

2. Description of Related Art

An electronic device may include a display constructed of a plurality of layers. A sensor disposed under the display may include a protective layer between the sensor and the display. The protective layer may include an opening to secure a path through which a signal transmitted or received at the sensor passes.

With the development of technologies, in order to increase a ratio of a displayed region of a screen presented through a front face of the electronic device, there is a growing demand for a sensor disposed under the display instead of a sensor disposed on a bezel.

The above information is presented as background information only to assist with an understanding of the disclosure. No determination has been made, and no assertion is made, as to whether any of the above might be applicable as prior art with regard to the disclosure.

SUMMARY

A display constructed through a process of stacking a plurality of layers may have a manufacturing tolerance caused by each layer, which may result in a change in a location of an opening corresponding to a path. In addition, in case of a flexible display, the location of the opening may be changed due to an inter-layer slip of the display constructed of the plurality of layers in addition to the manufacturing tolerance.

When the location of the opening is changed, there is a concern that an edge region of the opening may overlap the sensor, thereby degrading performance of the sensor. A solution is required to resolve the above concern.

Aspects of the disclosure are to address at least the above-mentioned problems and/or disadvantages and to provide at least the advantages described below. Accordingly, an aspect of the disclosure is to provide an electronic device including a display with an opening having a shape different from that of a sensor.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first face and a second face facing the first face to construct a space, a sensor module disposed on the second face and including a first sensor, a display disposed on the sensor module, and a protective sheet disposed between the sensor module and the display and constructing a first opening having a shape different from that of the sensor at a location corresponding to at least one sensor of the sensor module.

In accordance with another aspect of the disclosure, an electronic device is provided. The electronic device includes a housing including a first face and a second face facing the first face to construct a space, a sensor module disposed on the second face and including a first sensor, a display disposed on the sensor module, a Display Drive Integrate circuit (DDI) electrically coupled to the display, and a protective sheet disposed between the sensor module and the display and constructing a first opening including a region overlapping the sensor module at a location corresponding to the first sensor of the sensor module. The first opening may have a first width in a direction parallel to an edge of the display to which the DDI is disposed and a second width in a direction perpendicular to the edge of the display to which the DDI is disposed. The first width may be greater than the second width.

In accordance with another aspect of the disclosure, an electronic device is provided. The electronic device includes a housing including a first face and a second face facing the first face to construct a space, a sensor module disposed on the second face and including a first sensor, a display disposed on the sensor module and including a first align mark for the disposition, and a protective sheet disposed between the sensor module and the display and constructing a first opening including a region overlapping the sensor module at a location corresponding to the first sensor of the sensor module. The first opening may have a first width in a direction parallel to an edge where the second mark of the display is located and a second width in a direction perpendicular to the edge where the second mark is located. The first width may be greater than the second width.

An electronic device according to various embodiments may include a protective sheet with an opening constructed in a shape different from that of a rear sensor to prevent an edge of the opening from overlapping the rear sensor. Since the rear sensor does not overlap the edge of the opening, the electronic device can reduce that the sensor is covered. The electronic device is configured such that the opening has different widths, thereby preventing the covering caused by a tolerance occurring in a process of manufacturing the electronic device.

An electronic device according to various embodiments can prevent sensor performance deterioration caused by interference by minimizing an opening region.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
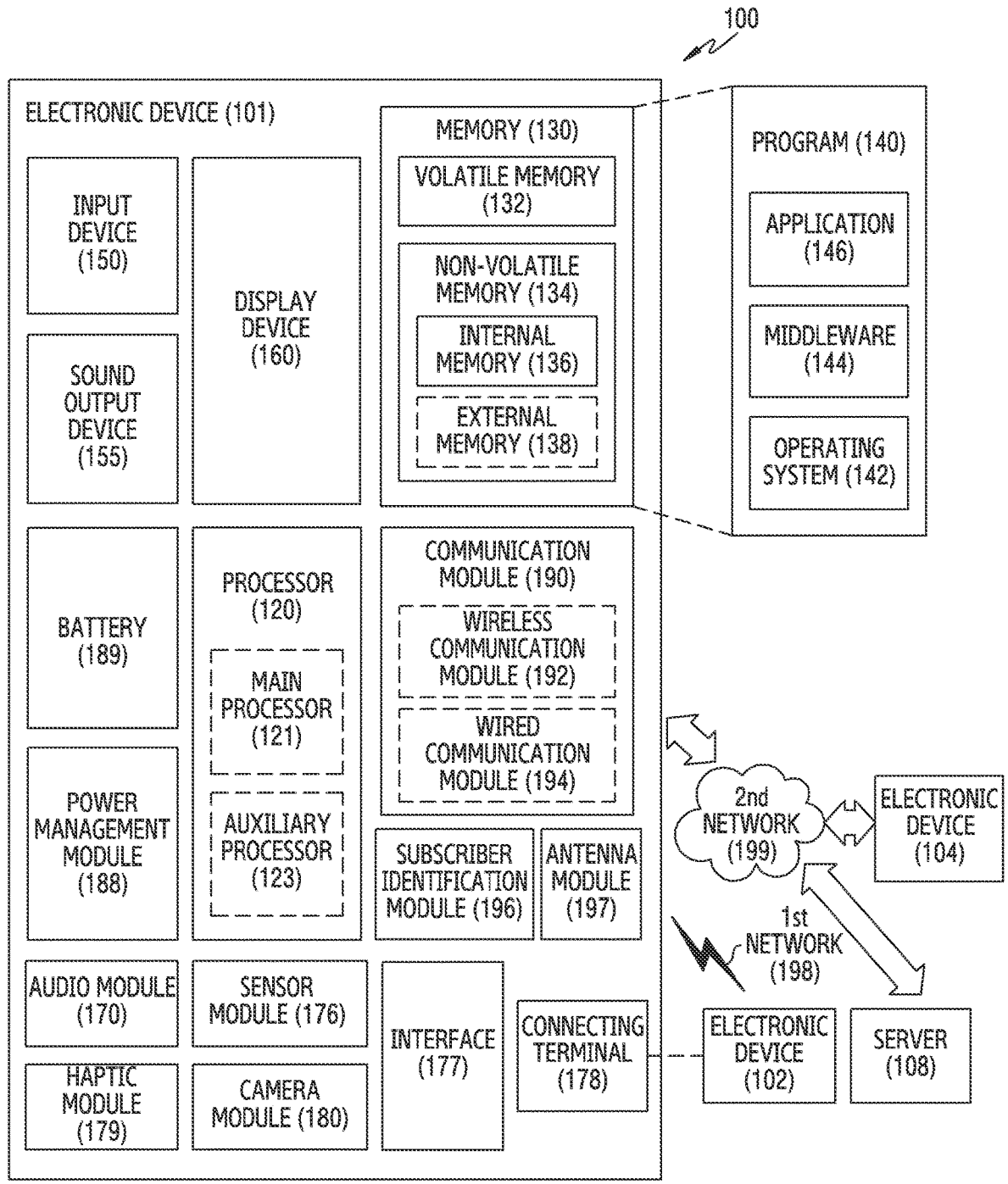
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
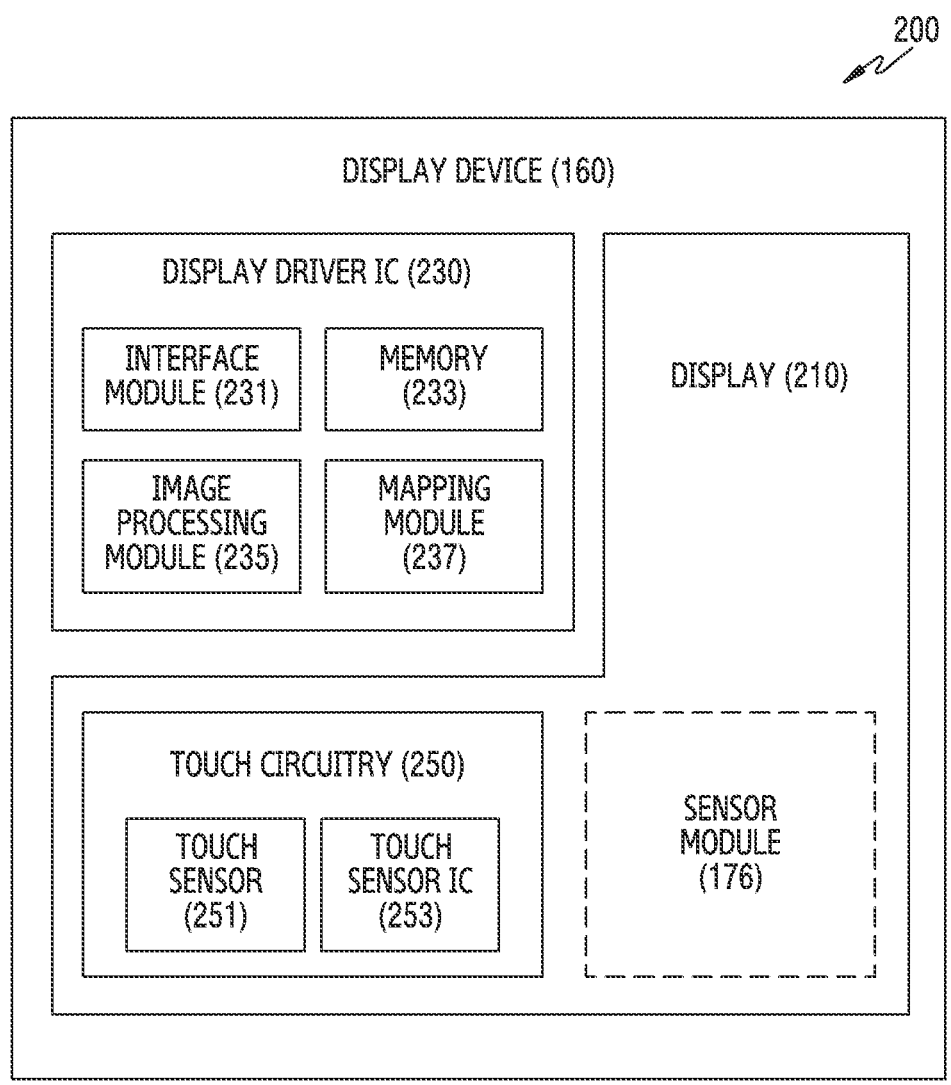
FIG. 2 is a block diagram illustrating a display device according to an embodiment of the disclosure.

FIG. 2 is a block diagram illustrating a display device according to an embodiment of the disclosure.

Referring to FIG. 2 depicting a block diagram 200, a display device 160 may include a display 210 and a Display Driver Integrated Circuit (DDI) 230 to control a display 210. The DDI 230 may include an interface module 231, a memory 233 (e.g., a buffer memory), an image processing module 235, or a mapping module 237. The DDI 230 may receive image information which includes image data or an image control signal corresponding to a command for controlling the image data from another component of the electronic device 101 through the interface module 231. For example, according to an embodiment, the image information may be received from the processor 120 such as the main processor 121 (e.g., an application processor) or the auxiliary processor 123 (e.g., a graphics processing unit) operated independently from the function of the main processor 121. The DDI 230 may communicate, for example, with a touch circuitry 250, the sensor module 176, or the like through the interface module 231. In addition, the DDI 230 may also store at least part of the received image information in the memory 233, for example, on a frame basis. The image processing module 235 may perform pre-processing or post-processing (e.g., adjustment of resolution, brightness, or size) with respect to at least part of the image data, based at least in part on a characteristic of the image data or a characteristic of the display 210. The mapping module 237 may generate a voltage value or current value corresponding to the image data pre-processed or post-processed through the image processing module 235. According to an embodiment, the generating of the voltage value or current value may be performed, for example, based at least in part on an attribute of pixels (e.g., an array, such as an RGB stripe or a pentile structure, of the pixels, or the size of each subpixel) of the display 210. At least some pixels of the display 210 may be driven, for example, based at least in part on the voltage value or current value such that visual information (e.g., a text, an image, or an icon) corresponding to the image data is displayed through the display 210.

According to an embodiment, the display device 160 may further include the touch circuitry 250. The touch circuitry 250 may include a touch sensor 251 and a touch sensor IC 253 for controlling the touch sensor 251. The touch sensor IC 253 may control the touch sensor 251 to detect a touch input or a hovering input with respect to a specific position on the display 210. For example, the touch sensor 251 may detect the touch input or the hovering input by measuring a change in a signal (e.g., a voltage, a quantity of light, a resistance, or a quantity of electric charge) corresponding to the specific position on the display 210. The touch circuitry 250 may provide the processor 120 with information (e.g., a position, an area, a pressure, or a time) regarding the detected touch input or hovering input. According to an embodiment, at least part (e.g., the touch sensor IC 253) of the touch circuitry 250 may be included as part of the DDI 230 or the display 210, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuitry thereof. In this case, the at least one sensor or the control circuitry thereof may be embedded in a portion (e.g., the display 210 or the DDI 230) of the display device 160 or a portion of the touch circuitry 250. For example, when the sensor module 176 embedded in the display device 160 includes a biometric sensor (e.g., a fingerprint sensor), the biometric sensor may obtain biometric information (e.g., a fingerprint image) associated with a touch input through some regions of the display 210. As another example, when the sensor module 176 embedded in the display device 160 includes a pressure sensor, the pressure sensor may obtain pressure information associated with a touch input through some or all regions of the display 210. According to an embodiment, the touch sensor 251 or the sensor module 176 may be disposed between pixels in a pixel layer of the display 210, or over or under the pixel layer.

The electronic device according to various embodiments disclosed in the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an Application-Specific Integrated Circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., Compact Disc Read Only Memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
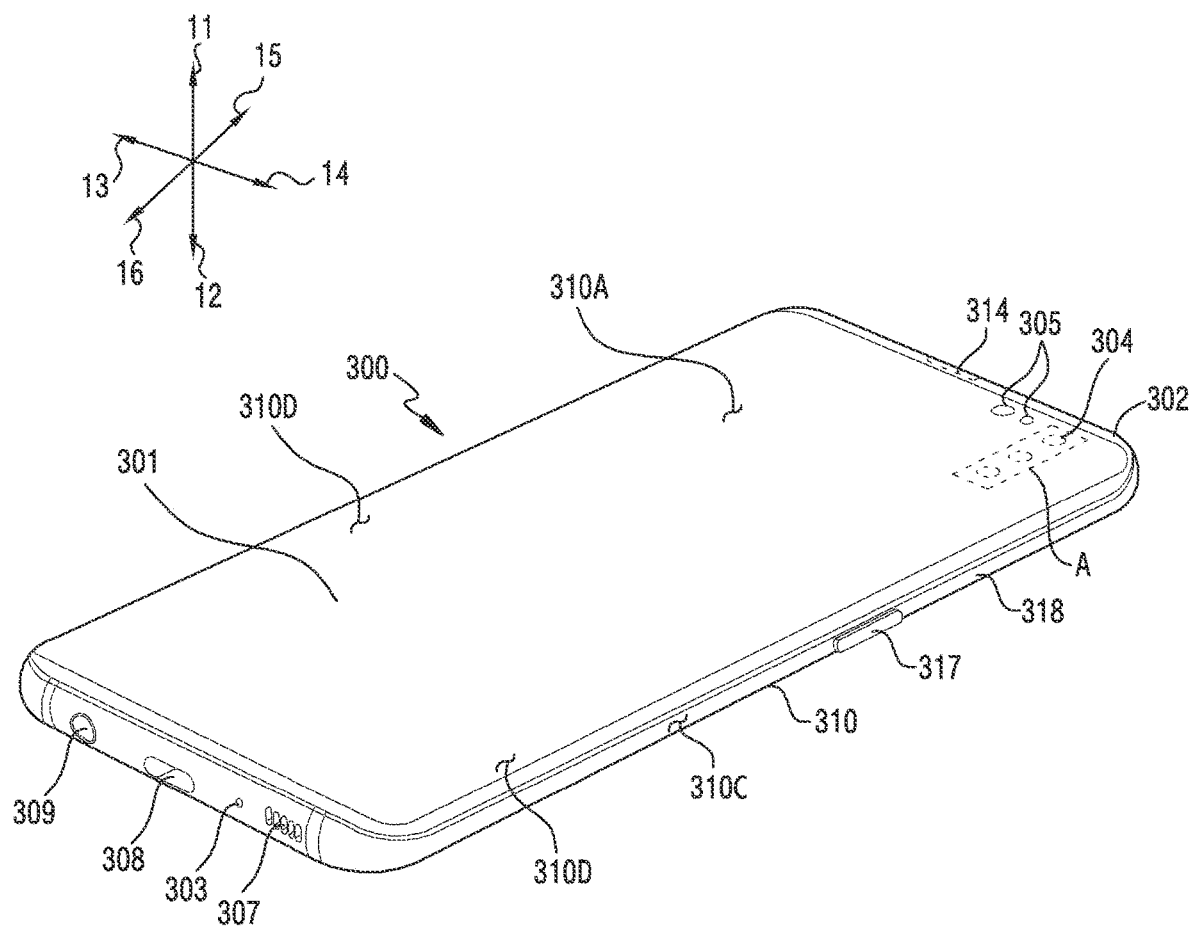
FIG. 3A is a front perspective view of an electronic device according to an embodiment of the disclosure.

FIG. 3A is a front perspective view of an electronic device (e.g., an electronic device of FIG. 1) according to an embodiment of the disclosure.

Figure 3B:
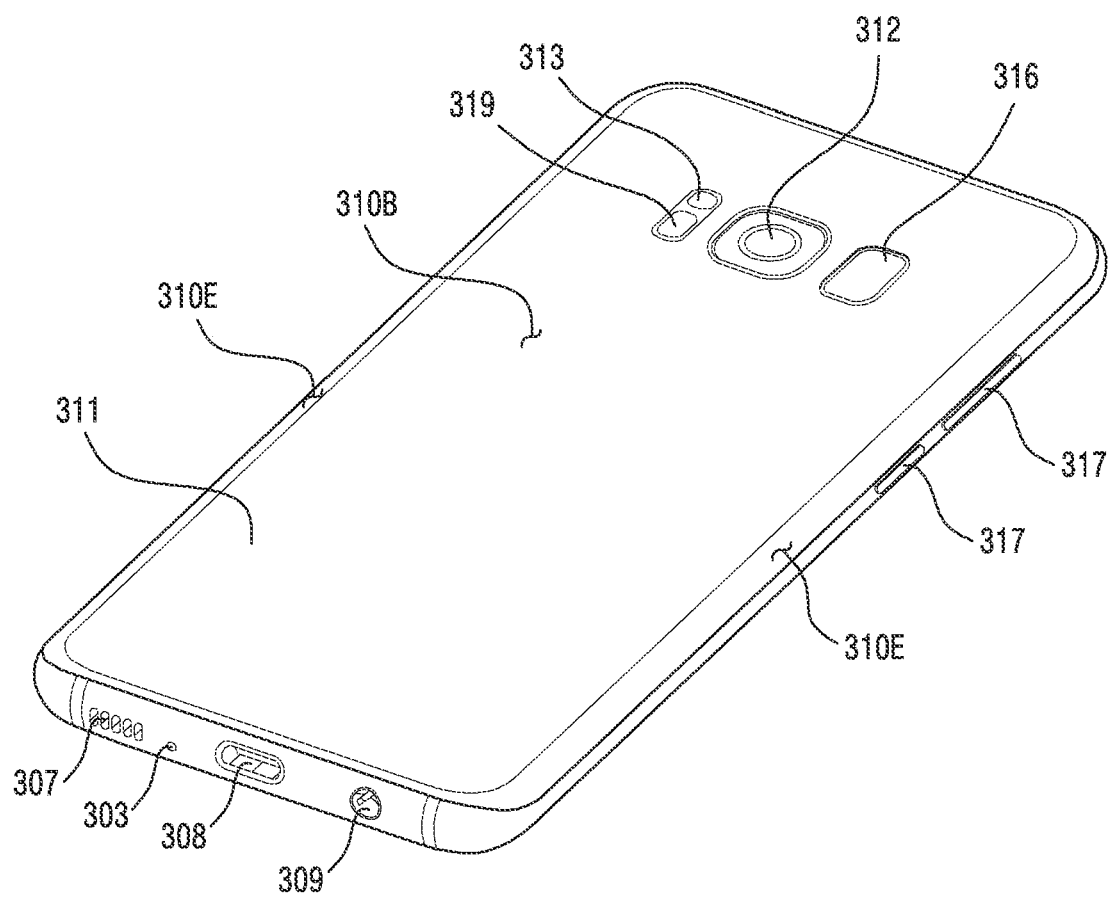
FIG. 3B is a rear perspective view of an electronic device of FIG. 3A according to an embodiment of the disclosure.

FIG. 3B is a rear perspective view of an electronic device of FIG. 3A according to an embodiment of the disclosure.

Referring to FIGS. 3A and 3B, an electronic device 300 of an embodiment can include a housing 310 which includes a first surface (or a front surface) 310A, a second surface (or a rear surface) 310B, and a side surface 310C surrounding a space between a first surface 310A and a second surface 310B. In another embodiment (not shown), the housing can denote a structure forming some of the first surface 310A, the second surface 310B and the side surface 310C of FIG. 3A as well. According to an embodiment, the first surface 310A can be formed by a front plate 302 (e.g., a glass plate including various coating layers, or a polymer plate) whose at least portion is substantially transparent. The second surface 310B can be formed by a substantially opaque back plate 311. The back plate 311 can be formed of, for example, a coated or colored glass, a ceramic, polymer, a metal (e.g., aluminum, a steel type stainless (STS) or magnesium), or a combination of at least two of the materials. The side surface 310C can be formed by a side bezel structure (or "side member") 318 coupled with the front plate 302 and the back plate 311 and including a metal and/or polymer. In some embodiment, the back plate 311 and the side bezel structure 318 can be integrally formed and can include the same material (e.g., a metallic material such as aluminum).

In an illustrated embodiment, the front plate 302 can include, at both ends of a long edge of the front plate 302, two first regions 310D which are bent from the first surface 310A toward the back plate 311 and are extended seamlessly. In an illustrated embodiment (referring to FIG. 3B), the back plate 311 can include, at both ends of the long edge, two second regions 310E which are bent from the second surface 310B toward the front plate 302 and are extended seamlessly. In some embodiment, the front plate 302 (or the back plate 311) can include only one of the first regions 310D (or the second regions 310E). In another embodiment, some of the first regions 310D or the second regions 310E may not be included. In the embodiments, when viewing from the side of the electronic device 300, the side bezel structure 318 can have a first thickness (or width) at a side not including the first regions 310D or second regions 310E, and have a second thickness thinner than the first thickness at a side including the first regions 310D or second regions 310E.

According to an embodiment, the electronic device 300 can include at least one or more of a display 301, audio modules 303, 307 and 314, sensor modules (e.g., sensor 304) and sensor modules 316 and 319, camera modules 305, 312 and 313, a key input device 317, a light emitting element 306 or connector holes 308 and 309. In some embodiment, the electronic device 300 can omit at least one (e.g., the key input device 317 or the light emitting element 306) of the components, or can additionally include another component.

The display 301, for example, can be exposed through a significant portion of the front plate 302. In some embodiment, at least a portion of the display 301 can be exposed through the first surface 310A, and the front plate 302 forming the first regions 310D of the side surface 310C. In some embodiment, an edge of the display 301 can be formed commonly identically with an adjacent outer shape of the front plate 302. In another embodiment (not shown), to extend an area in which the display 301 is exposed, an interval between the outer of the display 301 and the outer of the front plate 302 can be formed commonly identically.

In another embodiment (not shown), a recess or opening can be formed in a portion of a screen display region of the display 301, and at least one or more of the audio module 314, the sensor module (e.g., sensor 304), the camera module 305, and the light emitting element 306 which are aligned with the recess or the opening can be included. In another embodiment (not shown), at least one or more of the audio module 314, the sensor module (e.g., sensor 304), the camera module 305, the fingerprint scanning sensor (sensor module 316), and the light emitting element 306 can be included in a rear surface of the screen display region of the display 301. In another embodiment (not shown), the display 301 can be coupled with or be arranged adjacently with a touch sensing circuit, a pressure sensor capable of measuring a touch strength (pressure), and/or a digitizer obtaining a magnetic-type stylus pen. In some embodiment, at least some of the sensor modules (e.g., sensor 304) and 319 and/or at least some of the key input device 317 can be arranged in the first regions 310D and/or the second regions 310E.

The audio modules 303, 307 and 314, for example, can include a microphone hole (e.g., audio module 303) and speaker holes (e.g., audio modules 307 and 314). A microphone for acquiring an external sound can be arranged within the microphone hole (e.g., audio module 303). In some embodiment, a plurality of microphones can be arranged to obtain a direction of sound. The speaker holes (e.g., audio modules 307 and 314) can include an external speaker hole (e.g., audio module 307) and a call receiver hole (e.g., audio module 314). In some embodiment, the speaker holes (e.g., audio modules 307 and 314) and the microphone hole (e.g., audio module 303) can be implemented as one hole, or a speaker can be included without the speaker holes (e.g., audio modules 307 and 314) (e.g., a piezo speaker).

The sensor modules (e.g., sensor 304) and sensor modules 316 and 319, for example, can provide an electric signal or data value which corresponds to an operational state of the electronic device 300 or an environmental state external to the electronic device 300. The sensor modules (e.g., sensor 304) and sensor modules 316 and 319, in an embodiment, can include a first sensor module (e.g., sensor 304) (e.g., a proximity sensor) and/or a second sensor module (not shown) (e.g., a fingerprint scanning sensor) which are arranged in the first surface 310A of the housing 310, and/or a third sensor module 319 (e.g., an HRM sensor) and/or a fourth sensor module 316 (e.g., a fingerprint scanning sensor) which are arranged in the second surface 310B of the housing 310. The fingerprint scanning sensor can be arranged in the second surface 310B as well as the first surface 310A (e.g., the display 301) of the housing 310. The electronic device 300 can further include at least one of sensor modules not shown, for example, a gesture sensor, a gyro sensor, a barometer, a magnetic sensor, an acceleration sensor, a grip sensor, a color sensor, an infrared (IR) sensor, a biometric sensor, a temperature sensor, a humidity sensor, or an illuminance sensor (i.e., sensor 304). The first sensor module (e.g., sensor 304) and the second sensor module may be disposed under an active region of the display 301, and may not be visible from the outside.

The camera modules 305, 312 and 313, for example, can include a first camera device (e.g., camera module 305) arranged in the first surface 310A of the electronic device 300, and a second camera device (e.g., camera module 312) arranged in the second surface 310B, and/or a flash (e.g., camera module 313). The camera devices (e.g., camera modules 305 and 312) can include one or a plurality of lenses, an image sensor, and/or an image signal processor. The flash (e.g., camera module 313), for example, can include a light emitting diode or a xenon lamp. In some embodiment, two or more lenses (infrared camera, wide-angle and telephoto lenses) and image sensors can be arranged in one surface of the electronic device 300.

The key input device 317, for example, can be arranged in the side surface 310C of the housing 310. In another embodiment, the electronic device 300 may not include some or all of the above-mentioned key input devices 317, and a key input device 317 not included can be implemented on the display 301 in another form such as a soft key, etc. In some embodiment, the key input device 317 can include the sensor module 316 arranged in the second surface 310B of the housing 310.

The light emitting element may be disposed, for example, to the first face (e.g., first surface 310A) of the housing 310. The light emitting element may provide, for example, state information of the electronic device 300 in an optical form. In another embodiment, the light emitting element may provide, for example, a light source interworking with an operation of the camera module 305. The light emitting element may include, for example, an LED, an IR LED, and a xenon lamp.

The connector holes 308 and 309, for example, can include a first connector hole 308 capable of accepting a connector (for example, a USB connector) for transmitting and/or receiving power and/or data with an external electronic device, and/or a second connector hole (for example, an earphone jack) 309 capable of accepting a connector for transmitting and/receiving an audio signal with the external electronic device.

Figure 4:
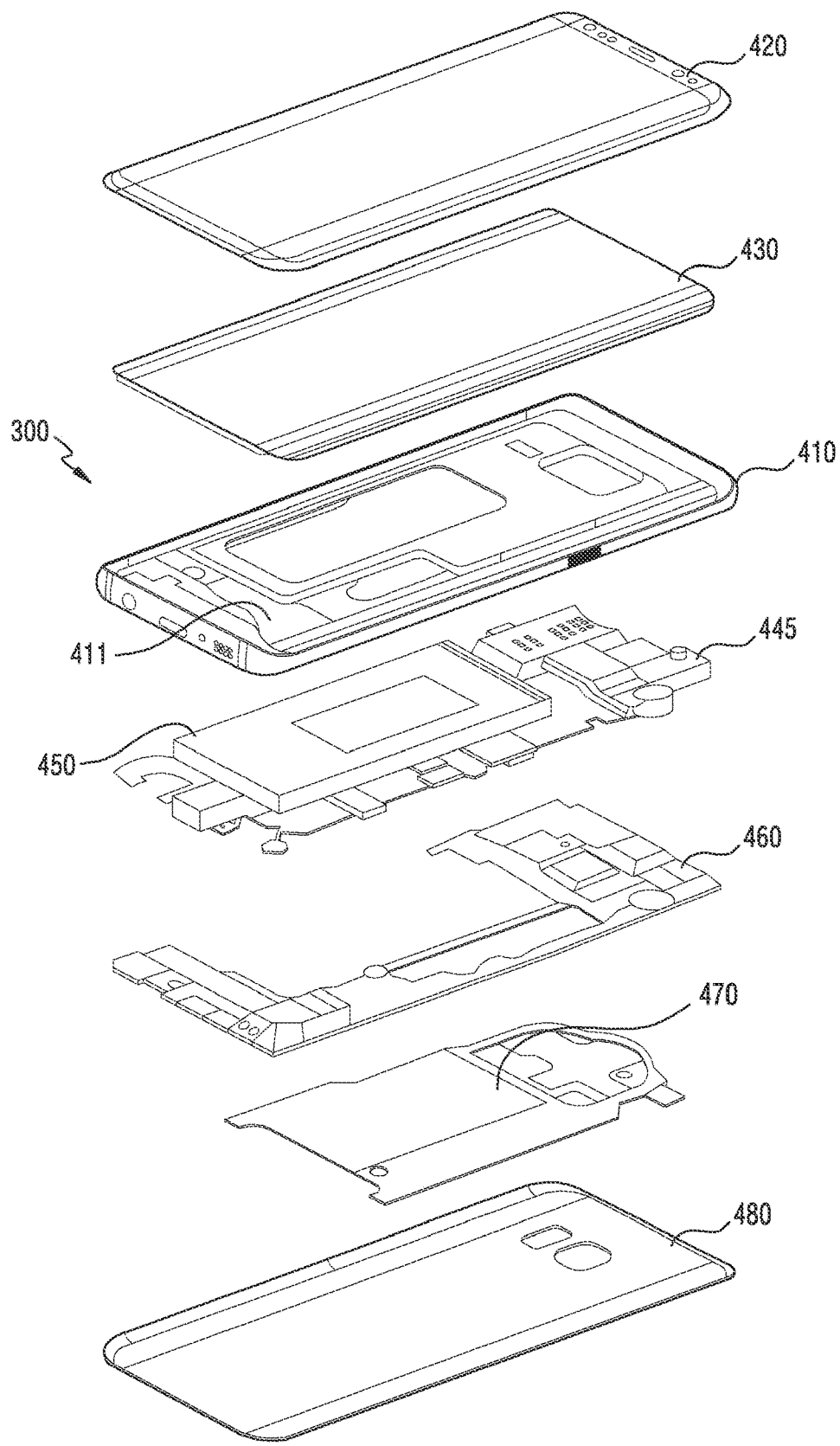
FIG. 4 is an exploded perspective view illustrating an electronic device of FIG. 3A according to an embodiment of the disclosure.

FIG. 4 is an exploded perspective view illustrating an electronic device of FIG. 3A according to an embodiment of the disclosure.

Referring to FIG. 4, an electronic device 300 may include a lateral bezel construction 410, a first support member 411 (e.g., a bracket), a front plate 420, a display 430, a printed circuit board (PCB) 445, a battery 450, a second support member 460 (e.g., a rear case), an antenna 470, and a rear plate 480. In some embodiments, the electronic device 300 may omit at least one (e.g., the first support member 411 or the second support member 460) of these components, or may additionally include other components. At least one of the components of the electronic device 300 may be the same as or similar to at least one of the components of the electronic device 101 of FIG. 1 or FIG. 2, and redundant descriptions will be omitted hereinafter.

The first support member 411 may be coupled with the lateral bezel construction 410 by being disposed inside the electronic device 300, or may be constructed integrally with respect to the lateral bezel construction 410. The first support member 411 may be constructed of, for example, a metal material and/or non-metal material (e.g., polymer). The display 430 may be bonded to one face of the first support member 411, and the printed circuit board 445 may be bonded to the other face thereof. A processor, a memory, and/or an interface may be mounted on the printed circuit board 445. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 300 and the external electronic device, and may include a USB connector, an SD card/MMC connector, or an audio connector.

As a device for supplying power to at least one component of the electronic device 300, the battery 450 may include, for example, a non-rechargeable primary cell, a rechargeable secondary cell, or a fuel cell. At least part of the battery 450 may be disposed on the same plane substantially with respect to, for example, the printed circuit board 445. The battery 450 may be disposed integrally inside the electronic device 300, or may be detachably disposed with respect to the electronic device 300.

The antenna 470 may be disposed between the rear plate 480 and the battery 450. The antenna 470 may include, for example, a Near Field Communication (NFC) antenna, a wireless charging antenna, and/or a Magnetic Secure Transmission (MST) antenna. The antenna 470 may perform NFC, for example, with the external electronic device, or may wirelessly transmit/receive power required for charging. In another embodiment, an antenna construction may be constructed by at least part of the lateral bezel construction 410 and/or the first support member 411 or a combination thereof.

Figure 5A:
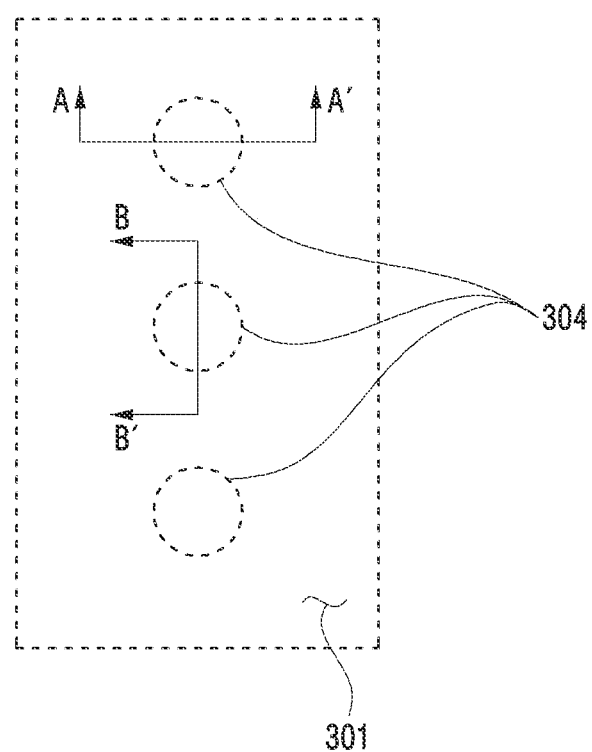
FIG. 5A is an enlarged view of a region A of FIG. 3A according to an embodiment of the disclosure.

FIG. 5A is an enlarged view of the region A of FIG. 3A according to an embodiment of the disclosure.

Figure 5B:
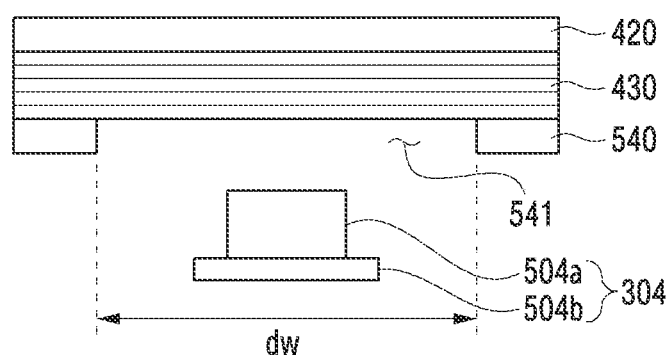
FIG. 5B is a cross-sectional view taken along the line A-A' of FIG. 5A

FIG. 5B is a cross-sectional view taken along a line A-A' of FIG. 5A according to an embodiment of the disclosure.

Figure 5C:
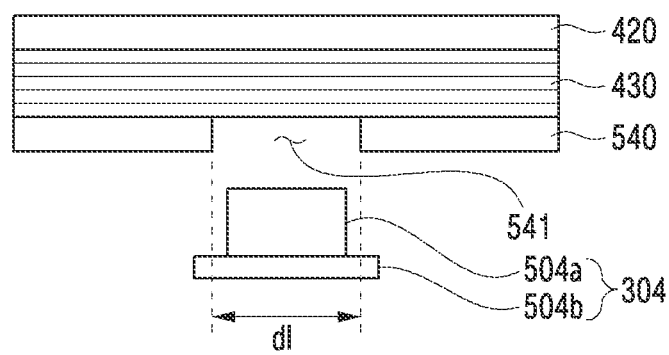
FIG. 5C is a cross-sectional view taken along a line B-B' of FIG. 5A according to an embodiment of the disclosure.

FIG. 5C is a cross-sectional view taken along a line B-B' of FIG. 5A according to an embodiment of the disclosure.

Referring to FIGS. 5A, 5B, and 5C, an electronic device 300 may include a front plate 420, a display 430 disposed under the front plate 420, a sensor 304 disposed under a display 430, or a protective sheet 540 disposed between a sensor 304 and a display 430 and in contact with the surface of a display 430.

The front plate 420 may protect the display 430 and transmit light emitted from pixels of the display 430 to the outside, so that information displayed on the display 430 is transmitted to the outside (e.g., a user). The front plate 420 may be constructed of a transparent material, and may be constructed of a polymer material or a transparent plastic or glass material. The front plate 420 may have a hardness sufficient to protect the display 430.

The display 430 may include a display module and a polarization layer disposed on the display module. The display 430 may include a panel disposed on a display substrate. The display panel may include a light emitting layer constituting a plurality of pixels and a Thin Film Transistor (TFT) for controlling light of each pixel.

The display 430 controls the TFT so that light generated from each pixel passes through the polarization layer and the front plate 420 and is transmitted to the outside of the electronic device 300. The polarization layer may convert the transmitted light into linearly polarized light and transform it into circularly polarized light by passing through a phase delay layer.

To protect the display 430, the electronic device 300 may include the protective sheet 540 disposed under the display 430. The protective sheet 540 may include a light-shielding layer (e.g., a black layer including an uneven pattern) or a buffer layer (e.g., a sponge layer). The protective sheet 540 may include an opening 541 corresponding to the sensor 304 disposed under the panel. The opening 541 may be a path of light or signals to be transmitted to the sensor 304.

The line A-A' of FIG. 5A may be parallel to a short edge of a lateral face (e.g., the lateral face 310c of FIG. 3A) of a housing (e.g., the housing 310 of FIG. 3A) and transverse a region to which the sensor 304 is disposed. The line B-B' of FIG. 5A may be parallel to a long edge of the lateral face of the housing and transverse a region to which the sensor is disposed.

Referring to FIG. 5B in which the display 430 is taken along the line A-A', the sensor 304 may include a base 504a and a body portion 504b. Components of the sensor 304 may be disposed on the base 504a, and the base 504a may support the body portion 504b. The body portion 504b may include an aperture (not shown) in a direction facing the opening 541. A first width dw of the opening 541 of the protective sheet 540 may be longer than a width of the body portion 504b of the sensor 304. Referring to FIG. 5C in which the display 430 is taken along the line B-B', a second width dl of the opening 541 of the protective sheet 540 may be longer than the width of the body portion 504b of the sensor 304. For example, when the front plate 420 is viewed from above, the body portion 504b may be included in the opening 541. The base 504a may overlap the opening 541 in some regions.

When viewed based on the width of the sensor 304, a ratio obtained by dividing the first width dw by the width of the sensor 304 may be greater than a ratio obtained by dividing the second width dl by the width of the sensor 304. For example, when the sensor 304 is constructed in a circular shape having the same width in all directions, the first width dw may be greater than the second width dl. As another example, when the sensor 304 has a polygonal shape, a difference between the second width dl and the width of the sensor 304 may be less than the width of the sensor 304, but a difference between the first width dw and the width of the sensor 304 may be greater than the width of the sensor 304. As another example, the opening 541 may be symmetrically or asymmetrically enlarged from the shape of the sensor 304. However, an enlargement ratio may be great in a direction of the first width dw, whereas the enlargement ratio may be small in a direction of the second width dl.

Figure 6:
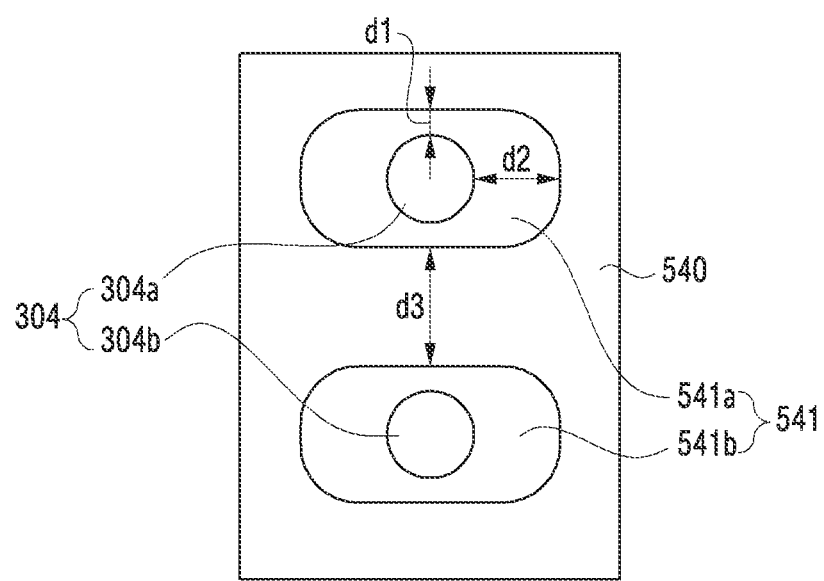
FIG. 6 illustrates a disposition of a protective sheet and a sensor in a region A of FIG. 3A according to an embodiment of the disclosure.

FIG. 6 illustrates a disposition of a protective sheet and a sensor in the region A of FIG. 3A according to an embodiment of the disclosure.

Referring to FIG. 6, a sensor 304 may include a first sensor 304a and a second sensor 304b. The protective sheet 540 may include a first opening 541a corresponding to the first sensor 304a and may include a second opening 541b corresponding to the second sensor 304b. The first sensor may be disposed in the first opening 541a and the second sensor 304b may be included in the second opening 541b.

The first sensor 304a and the second sensor 304b may be disposed to be spaced apart from each other, and the first opening 541a and the second opening 541b may be disposed to be spaced apart from each other. The first opening 541a and the second opening 541b may be disposed to be spaced apart to prevent interference or cross-talk of light or signals transmitted or received at the first sensor 304a and the second sensor 304b.

According to various embodiments, in the first opening 541a, the first sensor 304a may be disposed to be spaced apart by a first distance d1 in a direction parallel to a long edge of a lateral face (e.g., the lateral face 310c of FIG. 3A) of a housing (e.g., the housing 310 of FIG. 3A). In the first opening, the first sensor 304a may be disposed to be spaced apart by a second distance d2 in a direction parallel to a short edge of the lateral face of the housing. As an embodiment, in the first opening, the first sensor 304a may be asymmetrically spaced apart from both sides in a direction parallel to the lateral face of the housing. As an embodiment, in the first opening, the first sensor 304a may be symmetrically spaced apart from both sides in a direction parallel to the lateral face of the housing. The first opening 541a may have a size capable of securing an amount of light required for the sensor.

According to various embodiments, in the second opening 541b, the second sensor 304b may be disposed at a location corresponding to the first distance d1 and the second distance d2, similarly to the first sensor. The first opening 541a and the second opening 541b may be spaced apart by a third distance d3.

The first distance d1 may be minimized to prevent cross-talk of the first sensor 304a and second sensor 304b. The second distance d2 may be determined by considering a sufficient amount of light to secure performance of the sensor. According to another embodiment, the second distance d2 may be determined by considering a tolerance in a manufacturing process. The tolerance in the manufacturing process may be caused by a facility tolerance, an exterior tolerance, a tolerance occurring in a process of constructing an opening, a tolerance of a panel align mark, or a tilt tolerance of a protective sheet. Since the opening and the sensor may overlap due to the tilt tolerance, to prevent this, the second distance d2 may be longer than the first distance d1.

According to various embodiments, the sensor 304 may be a sensor including a light emitting unit and a light receiving unit, such as a proximity sensor, a camera, a Time of Flight (ToF) sensor, or an IR sensor. For example, the first sensor 304a or the second sensor 304b may be a light emitting sensor or a light receiving sensor.

A recognition error of the sensor can be prevented by maintaining a light-shielding region while appropriately securing a distance between the light emitting unit and light receiving unit of the sensor 304. In order to secure the light-shielding region, the third distance d3 may be secured between the first opening 541a and the second opening 541b. The first opening 541a or the second opening 541b may have a problem in that cross-talk is caused by other signals when an area thereof is increased, and may be manufactured in an appropriate size to secure an amount of light required for the sensor.

Figure 7A:
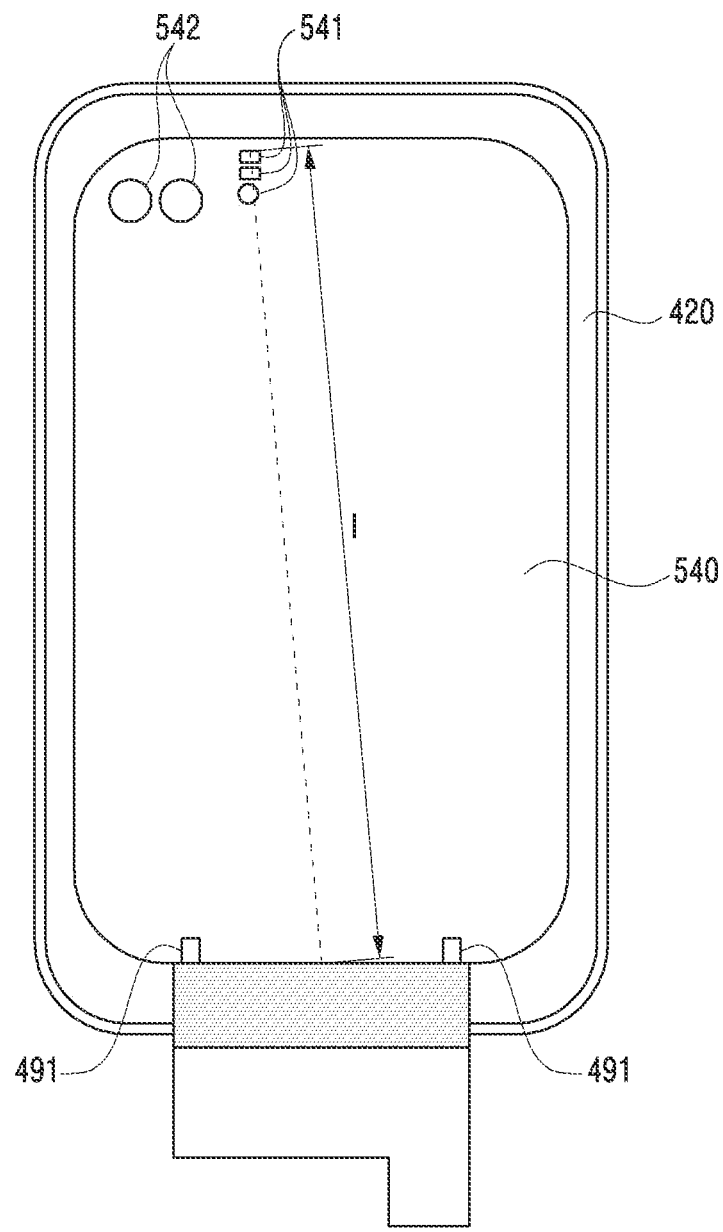
FIGS. 7A and 7B illustrate a disposition of a protective sheet according to various embodiments of the disclosure.
Figure 7B:
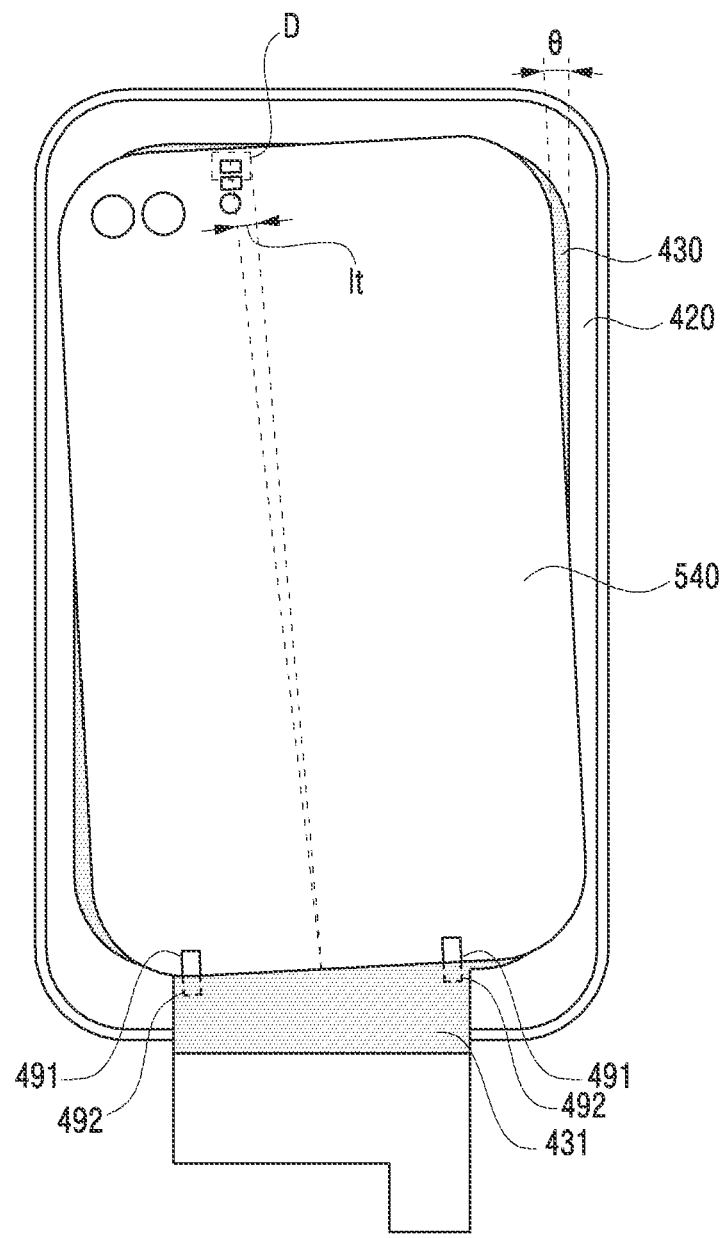

FIGS. 7A and 7B illustrate a disposition of a protective sheet according to various embodiments of the disclosure.

Figure 8A:
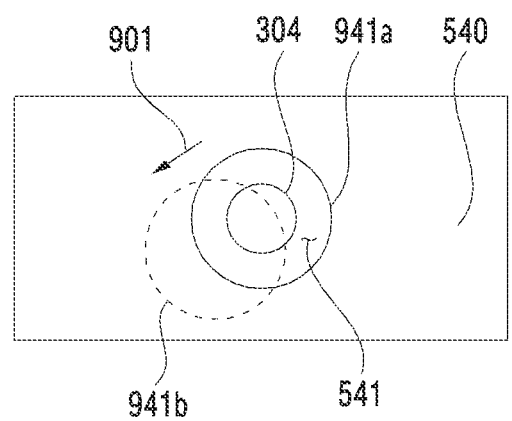
FIGS. 8A and 8B illustrate a location of an opening with respect to a sensor according to various embodiments of the disclosure.
Figure 8B:
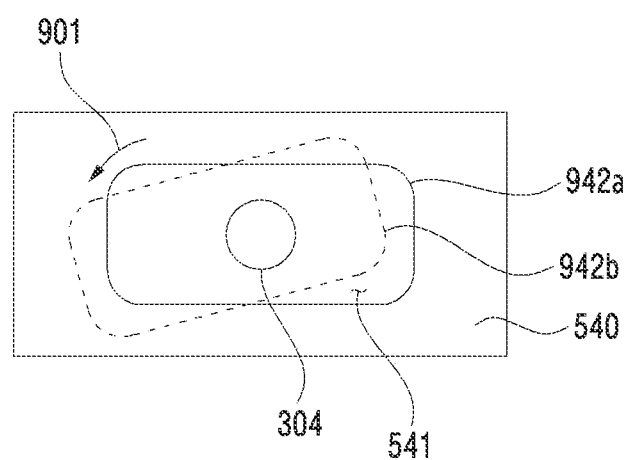

FIGS. 8A and 8B illustrate a location of an opening with respect to a sensor according to various embodiments of the disclosure.

Referring to FIGS. 7A and 7B, an electronic device 300 may include a display 430, a front plate 420, or a protective sheet 540. According to various embodiments, the protective sheet 540 may include an opening 541 for a sensor and corresponding to a location of the sensor and an opening 542 for a camera and corresponding to a location of the camera.

According to various embodiments, the display 430 may include a flexible printed circuit board 431 or Chip On Film (COF) which is coupled to a Display Drive Integrate circuit (DDI) at one edge. The edge at which the flexible printed circuit board or the COF is coupled to the display 430 may be substantially parallel to a short edge of the housing (e.g., the housing 310 of FIG. 3A). In order to align the display 430 and the protective sheet 540, the protective sheet 540 may include a first align mark 491 at one edge, and may include a second align mark 492 at an edge corresponding to one edge of the protective sheet 540 in the flexible printed circuit board 431. In a process of manufacturing the display 430 and the protective sheet 540, the first align mark 491 and the second align mark 492 may be used to align the display 430 and the protective sheet 540. For example, the second align mark 492 may be disposed at a designated location, based on the first align mark 491 displayed on the display 430. The front plate 420, the display 430, and the protective sheet 540 may be aligned according to the disposition of the second align mark 492. The protective sheet 540 and the display 430 include the first align mark 491 and the second align mark 492 at one edge, as criteria of alignment. Therefore, in the opening 541 for the sensor and corresponding to the location of the sensor, a tolerance may be more increased in a direction in which one edge extends, compared to the other edge facing the edge where the align mark is indicated. For example, if an angular error which occurs when the display 430 and the protective sheet 540 are assembled is θ and a distance to the opening 541 for the sensor is 1, a distance error 1t between a location at which the opening 541 for the sensor is to be located and an actual disposition location may be 1×θ. Since the distance error 1t is in proportion to the distance 1 from one edge to the opening 541 for the sensor, a tolerance caused by rotation may be increased as the opening 541 for the sensor is farther in distance to the edge marked with the align mark. When the opening 541 for the sensor overlaps the sensor, the sensor may be covered by the protective sheet. Therefore, the opening 541 for the sensor may have a long length in a direction in which the edge marked with the align mark extends.

Referring to FIG. 8A, a location 941b of the opening for the sensor actually disposed may be moved by 1t in a rotational direction 901 from a location 941a of a designed opening for the sensor. An edge of the opening 541 for the sensor may overlap the sensor 304. The sensor 304 may have a short recognition distance. A signal output to the outside or a signal to be received may be reduced in amount or distorted.

Referring to FIG. 8B, an opening 541 for the sensor may have the same shape as a first opening 541a or second opening 541b of FIG. 6. For example, the opening 541 for the sensor may be an opening having a long width in a direction parallel to one edge of the protective sheet 540 in which the first align mark 591 or the second align mark 592 is located.

Figure 9A:
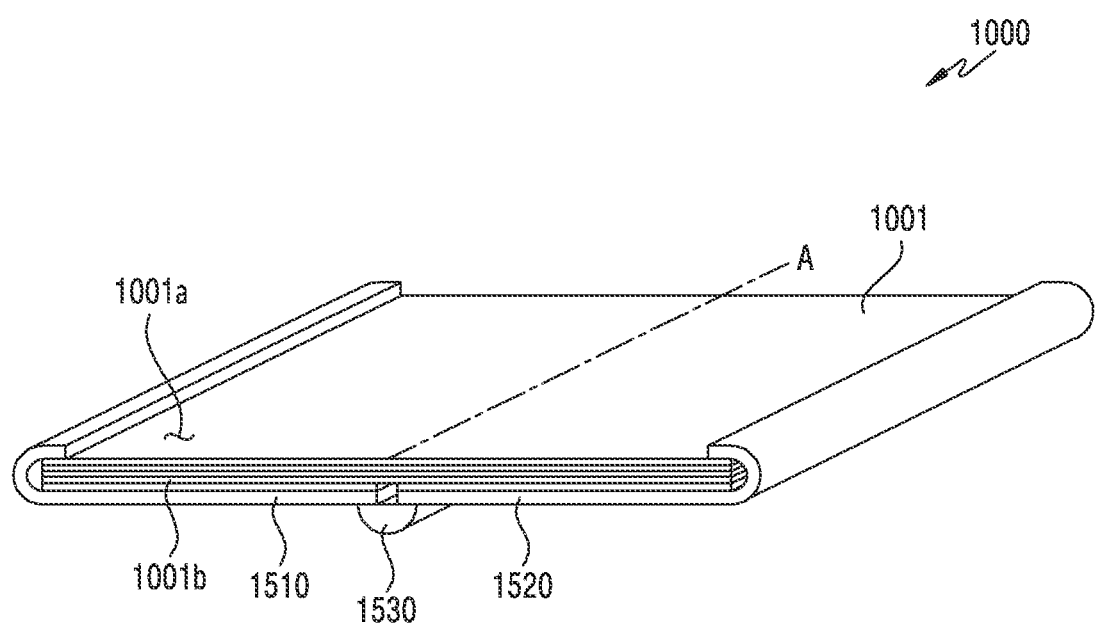
FIG. 9A illustrates a layer of a display when an electronic device is in an unfolded state according to an embodiment of the disclosure.

FIG. 9A illustrates a layer of a display when an electronic device is in an unfolded state according to an embodiment of the disclosure.

Figure 9B:
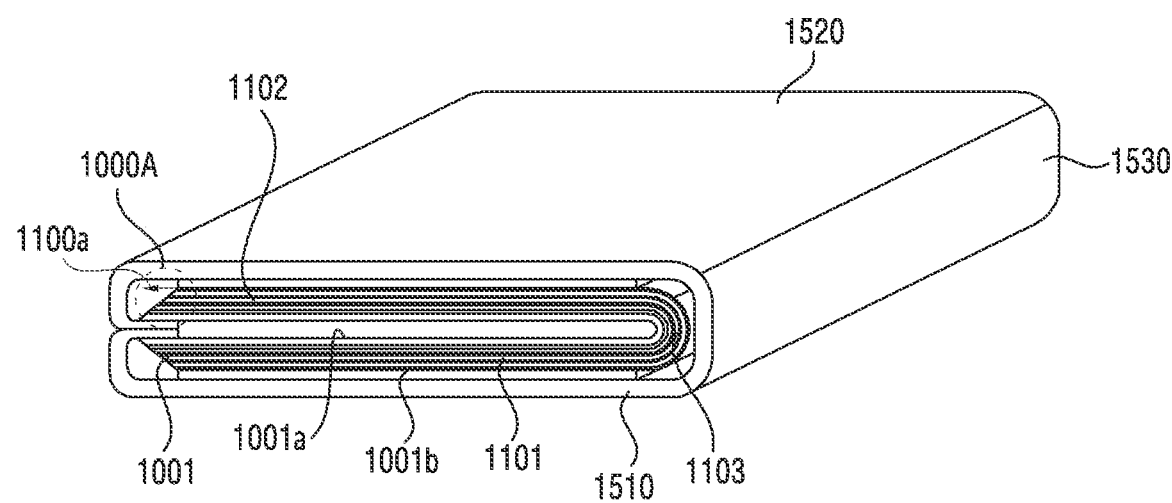
FIG. 9B illustrates a layer of a display in which a slip occurs when an electronic device is in a folded state according to an embodiment of the disclosure.

FIG. 9B illustrates a layer of a display in which a slip occurs when an electronic device is in a folded state according to an embodiment of the disclosure.

According to various embodiments, a shape of the opening may be different from a shape of the sensor 304. When the opening has a wide width in the rotational direction 901, the edge of the opening 541 for the sensor can be prevented from overlapping the sensor 304 even if it moves from a location 942a of the designed opening for the sensor to a location 942b of the actual opening 541 for the sensor.

Referring to FIGS. 9A and 9B, an electronic device 1000 (e.g., an electronic device 101) may be a flexible electronic device. A display 1001 may be disposed to a space constructed by a first housing structure 1510, a second housing structure 1520, and a hinge cover 1530. The display 1001 may be constructed of a ductile material and thus may transition from an unfolded state to a folded state by a hinge structure disposed inside the hinge cover 1530. The display 1001 may be constructed to be supported by a bracket. The bracket may be surrounded by the first housing structure 1510 and the second housing structure 1520. As an embodiment, the display 1001 may transition from the unfolded state to the folded state in an in-folding manner by the hinge structure disposed inside the hinge cover 1530. As an embodiment, the display 1001 may transition from the unfolded state to the folded state in an out-folding manner by the hinge structure disposed inside the hinge cover 1530.

According to various embodiments, the display 1001 may include a first face 1001a and a second face 1001b facing the first face 1001a, and the display 1001 may be constructed by stacking a plurality of layers. As shown in FIG. 9A, when the electronic device 1000 is in the unfolded state, the layers constituting the display 1001 may not be deformed. For example, a lateral face of a layer constituting the first face 1001a may coincide with that of a layer constituting the second face 1001b.

According to various embodiments, as shown in FIG. 9B, when the electronic device is in the folded state, the layers constituting the display 1001 may be deformed. For example, a slip may occur in each of the plurality of layers of the display 1001. When the second face 1001b of the display 1001 is fixed by a bracket, a slip may occur in a plurality of layers facing the first face 1001a from the second face 1001b. Referring to a region 1000A, a slip direction 1100a of the plurality of layers constituting the display 1001 may be a direction perpendicular to a folding axis (an A-axis) on the surface of the display 1001.

Among the plurality of layers constituting the display 1001, a layer constituting the first face 1001a may have a greater curvature than the other layers when in the folded state. For example, among the plurality of layers constituting the display 1001, the layer constituting the first face 1001a may have a short radius of curvature, and thus an arc constituting a folding region 1103 may be short in length. A length in the direction perpendicular to the folding axis (the A-axis) of the layer constituting the first face 1001a in the first region 1101 and second region 1102 extending from the folding region 1103 may be longer than that in the other layers constituting the display 1001. Among the plurality of layers constituting the display 1001, the layer constituting the second face 1001b may have a less curvature than the other layers when in the folded state. For example, among the plurality of layers constituting the display 1001, the layer constituting the second face 1001b may have a long radius of curvature, and thus an arc constituting the folding region 1103 may be long in length. A length in the direction perpendicular to the folding axis (the A-axis) of the layer constituting the second face 1001b in the first region 1101 and second region 1102 extending from the folding region 1103 may be shorter than that in the other layers constituting the display 1001.

According to various embodiments, the plurality of layers constituting the display 1001 may be constructed such that an arc constructed in the folding region 1103 has a different length, and thus a length in a direction perpendicular to the folding axis may be different in the first region 1101 and the second region 1102. Since the layers constituting the first region 1101 and second region 1102 have different lengths, a slip may occur in a direction perpendicular to the folding axis (the A-axis).

Figure 10A:
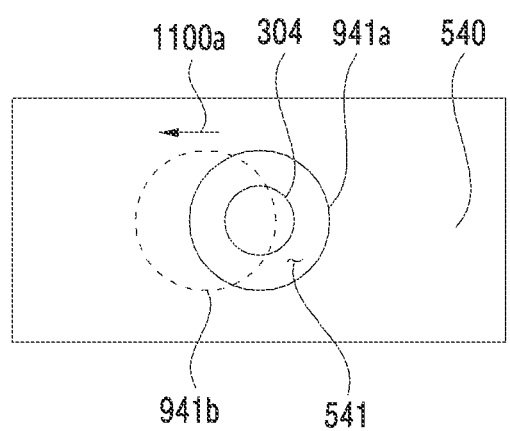
FIGS. 10A and 10B illustrate a location of an opening with respect to a sensor when an electronic device is in a folded state or in an unfolded state according to various embodiments of the disclosure.
Figure 10B:
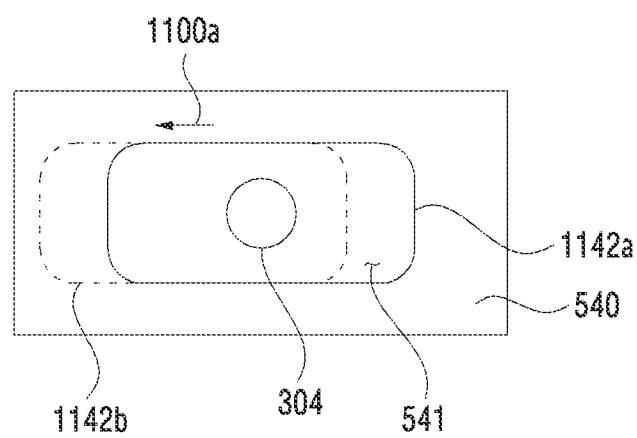

FIGS. 10A and 10B illustrate a location of an opening with respect to a sensor when an electronic device is in a folded state or in an unfolded state according to various embodiments of the disclosure.

A location 941b of an actually disposed opening for a sensor may be moved by a slip distance in a slip direction 1100a from a location 941a of a designed opening for the sensor. An edge of an opening 541 for the sensor may overlap a sensor 304. The sensor may have a short recognition distance. A signal output to the outside or a signal to be received may be reduced in amount or distorted.

Referring to FIG. 10B, the opening for the sensor may have the same shape as a first opening 541a or second opening 541b of FIG. 6. For example, the opening for the sensor may be an opening having a long width in the slip direction of a flexible display.

According to various embodiments, a shape of the opening may be different from a shape of the sensor 304. When the opening has a wide width in the slip direction 1100a, the edge of the first opening 541a or second opening 541b can be prevented from overlapping the sensor 304 even if it moves from a location 1142a of the designed opening for the sensor to a location 1142b the actual opening for the sensor. According to various embodiments, when a shear behavior occurs in layers constructed at an upper portion of the display 430 or sensor 304, a shape and size of the opening for the sensor may be determined by considering an error caused by the shear behavior.

FIGS. 11, 12, 13, and 14 illustrate a shape of an opening and sensor of a protective sheet according to various embodiments of the disclosure.

Figure 11:
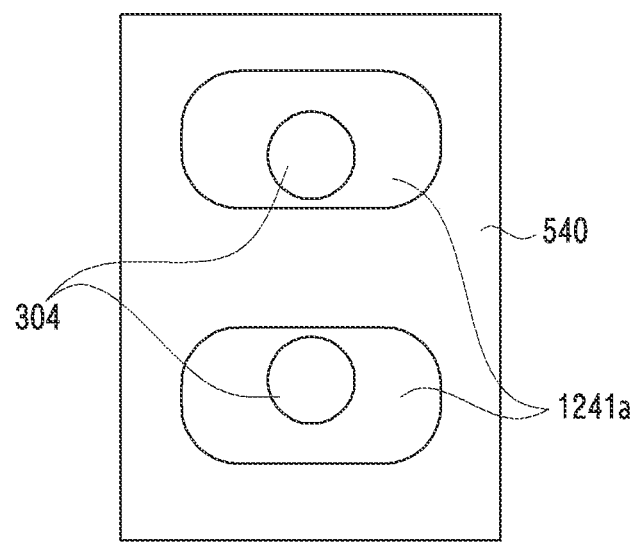
FIGS. 11, 12, 13 and 14 illustrate a shape of an opening and sensor of a protective sheet according to various embodiments of the disclosure.

Referring to FIG. 11, a sensor 304 may include a first sensor (e.g., the first sensor 304a of FIG. 6) and a second sensor (e.g., the second sensor 304b of FIG. 6). The sensor 304 may be a sensor module including a light emitting unit and a light receiving unit, such as a proximity sensor. An opening 1241a corresponding to the sensor 304 may have the same or similar shape as the opening of FIG. 6, and a location of the sensor 304 may be different.

According to various embodiments, in case of a sensor including the light emitting unit and the light receiving unit, a light-shielding region of the light emitting unit and light receiving unit may be included in a protective sheet 540 to prevent a sensor defect. When a tilt tolerance occurs during a manufacturing process or a slip occurs in layers constituting a flexible display, the opening 1241a may be constructed with a larger size than the sensor 304 to prevent the sensor of the opening from being covered by the slip. When the size of the opening 1241a is increased to be the same as the shape of the sensor 304, unnecessary noise caused by signals or light introduced from the outside is increased, thereby deteriorating sensing performance of the sensor. According to various embodiments, the sensing performance of the sensor may deteriorate when the light-shielding region between the light emitting unit and the light receiving unit is reduced. In order to secure the light-shielding region, the opening 1241*a* facing the light emitting unit and light receiving unit may be constructed to have a narrow width.

According to various embodiments, in the opening 1241*a*, the sensor 304 may be constructed adjacent to a corner or edge of the opening close to another sensor. When the sensor 304 is disposed adjacent to the edge of the opening close to another sensor, the light-shielding region between the light emitting unit and the light receiving unit may be enlarged while fixing a location of the sensor 304. When the light-shielding region is enlarged, the light-shielding region is sufficiently secured between the light emitting unit and the light receiving unit, thereby reducing a sensor defect rate caused by external signal interference.

Figure 12:
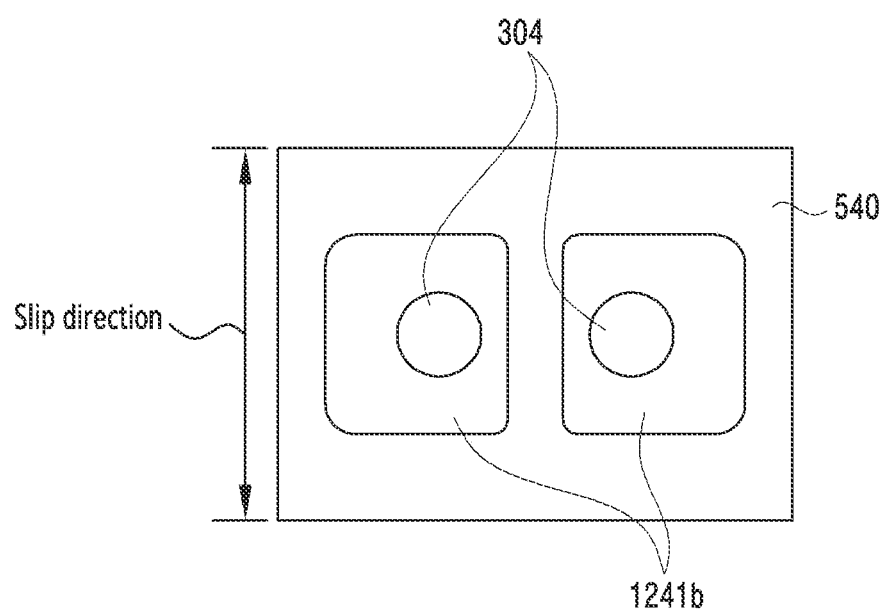

Referring to FIG. 12, the light emitting unit and light receiving unit of a sensor 304 may be disposed to correspond to a rotational direction of a protective sheet 540 or to correspond to a slip direction of a layer constituting a display. The slip may occur in a vertical direction. The opening 1241*b* to which the sensor 304 is disposed may be constructed to have a shape larger than the shape of the sensor 304 in order to prevent from being covered by the slip of the layer or the tilt tolerance of the protective sheet 540. In order to secure the light-shielding region between the light emitting unit and the light receiving unit, unlike in FIG. 11, an opening of a portion facing another sensor may be constructed to be flat.

Figure 13:
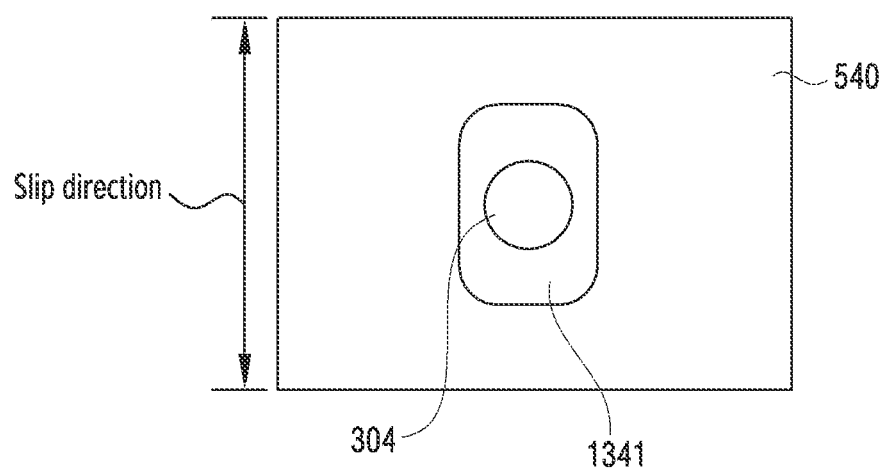

Referring to FIG. 13, there may be only one sensor 304 and opening 1341. In this case, the protective sheet 540 may be determined to have the shape of the opening 1341 by considering the tilt tolerance and the slip distance. Herein, the slip may occur in the vertical direction.

Figure 14:
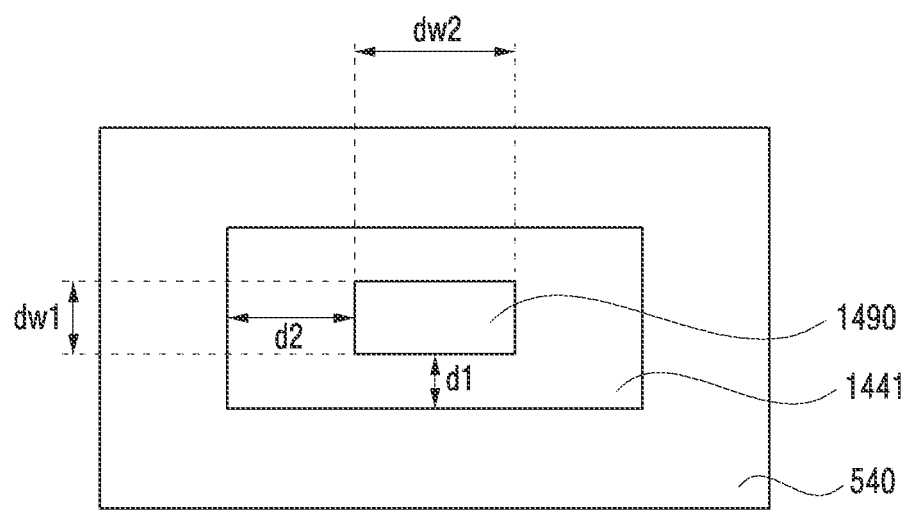

Referring to FIG. 14, a sensor 1490 may have a polygonal shape. An opening 1441 may be spaced apart from the sensor 1490 by a first distance d1 in a direction in which the slip of the display does not occur or the tilt tolerance hardly occurs. The opening 1441 may be spaced apart from the sensor 1490 by a second distance d2 in a direction in which the slip of the display occurs or in a direction in which the tilt tolerance occurs. A ratio of the first distance d1 between the opening 1441 and the sensor 1490 in the direction in which the tilt tolerance hardly occurs or in the direction in which the slip does not occur and the first width dw1 of the sensor may be less than a ratio of the second distance d2 between the opening 1441 and the sensor 1490 in the direction in which the slip or the tilt tolerance occurs and the second width dw2 of the sensor.

Even in case of the polygonal shape, the number of lines constituting an exterior may be the same, but the opening may be constructed in a shape in which an enlargement ratio is different. By securing the second width dw2 between the sensor 1490 and the opening 1441 in the direction in which the slip of the display or the tilt tolerance occurs, the protective sheet 540 may be prevented from covering the sensor 1490 by an outer edge of the opening 1441 due to the tilt tolerance or the slip of the layer constituting the display.

Hereinafter, the aforementioned electronic device may be manufactured such that an opening of a protective sheet disposed under a display has a shape different from that of a sensor, in order to reduce influence of a manufacturing tolerance (e.g., a tilt tolerance or a rotation tolerance) which may occur in a process of manufacturing the electronic device. The opening may be shaped such that a width of the opening, greatly affected by the manufacturing tolerance, is extended to be wide. The opening may be constructed to have a long width in a direction parallel to an edge in which an align mark indicated to assemble the electronic device is located. Even if the opening has an error as much as the tolerance, the edge of the opening and the sensor do not overlap each other, thereby securing sensor performance.

In case of a sensor module constructed of a plurality of sensors, a light-shielding region may be secured between the sensors to prevent a malfunction of the sensor.

An electronic device according to various embodiments may include a housing (e.g., the housing 310 of FIG. 3A) including a first face and a second face facing the first face to construct a space, a sensor module (e.g., the sensor 304 of FIG. 3A) disposed to the space and including a first sensor (e.g., the first sensor 304*a* of FIG. 6) facing the first face, a display (e.g., the display 430 of FIG. 4) disposed on the sensor module, and a protective sheet (e.g., the protective sheet 540 of FIG. 5B) disposed to one face of the display and constructing a first opening (e.g., the opening 541 of FIG. 5B or the first opening 541*a* of FIG. 6) having a shape different from that of the first sensor at a location corresponding to the first sensor of the sensor module.

According to various embodiments, the housing may include two long edges facing each other and two short edges facing each other. In the first opening, a first width (e.g., the first width d2 of FIG. 5B) in a direction parallel to the short edge may be different from a second width (e.g., the second width d1 of FIG. 5C) in a direction parallel to the long edge.

According to various embodiments, the display may be electrically coupled to a Display Drive Integrate circuit (DDI) through a flexible printed circuit board. The first width may be longer than the second width when an edge in which the flexible printed circuit board is coupled to the display is substantially parallel to the short edge of the housing.

According to various embodiments, a ratio of the first width with respect to a width of the first sensor corresponding to the first width may be greater than a ratio of the second width with respect to a width of the first sensor corresponding to the second width.

According to various embodiments, the sensor module may include a second sensor, and the protective sheet further may include a second opening corresponding to the second sensor.

According to various embodiments, the first opening and the second opening may be disposed to be spaced apart.

According to various embodiments, the first sensor may be a light emitting unit, and the second sensor may be a light receiving unit.

According to various embodiments, the first sensor may be disposed unilaterally to some edges of the first opening.

According to various embodiments, the sensor module may be not visible by being covered by the display, when viewed from the outside.

According to various embodiments, the display may be a foldable display having a folding axis (e.g., the folding axis A of FIG. 9A).

According to various embodiments, in the first opening, a first width perpendicular to the folding axis may be different from a second width parallel to the folding axis, and the first width may be greater than the sum of a slip distance of the display and the width of the first sensor.

An electronic device according to various embodiments may include a housing (e.g., the housing 310 of FIG. 3A)

including a first face and a second face facing the first face to construct a space, a sensor module (e.g., the sensor 304 of FIG. 3A) disposed to the space and including a first sensor (e.g., the first sensor 304a of FIG. 6) facing the first face, a display disposed on the sensor module, a Display Drive Integrate circuit (DDI) electrically coupled to the display, and a protective sheet disposed between the sensor module and the display and constructing a first opening (e.g., the opening 541 of FIG. 5B or the first opening 541a of FIG. 6) including a region overlapping the sensor module at a location corresponding to the first sensor of the sensor module. The first opening may have a first width (e.g., the first width dw of FIG. 5B) in a direction parallel to an edge of the display to which the DDI (e.g., the DDI 230 of FIG. 2) is disposed and a second width (e.g., the second width dl of FIG. 5B) in a direction perpendicular to the edge of the display to which the DDI is disposed. The first width may be greater than the second width.

According to various embodiments, a ratio of the first width with respect to a width of the first sensor parallel to the first with may be greater than a ratio of the second width with respect to a width of the first sensor parallel to the second width.

According to various embodiments, the sensor module may include a second sensor, and the protective sheet may further include a second opening (e.g., the second opening 541b of FIG. 6) corresponding to the second sensor.

According to various embodiments, the first opening and the second opening may be disposed to be spaced apart.

According to various embodiments, the first sensor may be disposed adjacent to an edge of the first opening close to the second sensor, and the second sensor may be disposed adjacent to an edge of the second opening close to the first sensor.

According to various embodiments, the first sensor may be a light emitting unit, and the second sensor may be a light receiving unit.

According to various embodiments, the sensor module may be not visible by being covered by the display, when viewed from the outside.

An electronic device according to various embodiments may include a housing (e.g., the housing 310 of FIG. 3A) including a first face and a second face facing the first face to construct a space, a sensor (e.g., the sensor 304 of FIG. 3A) disposed to the space and facing the first face, display disposed on the sensor and including a first align mark for the disposition, and a protective sheet (e.g., the protective sheet 540 of FIG. 5B) disposed between the sensor and the display and constructing a first opening (e.g., the opening 541 of FIG. 5B or the first opening 541a of FIG. 6) including a region overlapping the sensor at a location corresponding to the sensor. The first opening may have a first width (e.g., the first width dw of FIG. 5B) in a direction parallel to an edge where the first align mark of the display is located and a second width (e.g., the second width dl of FIG. 5C) in a direction perpendicular to the edge where the first align mark is located. The first width may be greater than the second width.

According to various embodiments, a ratio of the first width with respect to a width of the sensor parallel to the first width may be greater than a ratio of the second width with respect to a width of the sensor parallel to the second width.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
a housing;
a display;
a first sensor disposed under the display; and
a protective sheet disposed to one face of the display and constructing a first opening at a location corresponding to the first sensor,
wherein the housing comprises two long edges facing each other and two short edges facing each other,
wherein the first opening has a first width in a direction parallel to a short edge of the two short edges and a second width in a direction parallel to a long edge of the two long edges, and
wherein a ratio of the first width with respect to a width of the first sensor in a direction substantially parallel to the first width is greater than a ratio of the second width with respect to a width of the first sensor in a direction substantially parallel to the second width.
2. The electronic device of claim 1, wherein the first width is different from the second width.
3. The electronic device of claim 2, wherein the display is electrically coupled to a display drive integrated circuit (DDI) through a flexible printed circuit board or a chip on film (COF), and wherein the first width is longer than the second width when an edge in which the flexible printed circuit board or the COF is coupled to the display is substantially parallel to the short edge of the housing.
4. The electronic device of claim 3, further comprising:
a second sensor,
wherein the protective sheet further comprises a second opening corresponding to the second sensor.
5. The electronic device of claim 4, wherein the first opening and the second opening are disposed to be spaced apart.
6. The electronic device of claim 4, wherein the first sensor is a light emitting circuitry, and the second sensor is a light receiving circuitry.
7. The electronic device of claim 1, wherein the first sensor is disposed unilaterally to some edges of the first opening.
8. The electronic device of claim 1, wherein a sensor circuitry is not visible by being covered by the display, when viewed from the outside.
9. The electronic device of claim 1, wherein the display is a foldable display having a folding axis.
10. The electronic device of claim 9, wherein in the first opening, a first width perpendicular to the folding axis is different from a second width parallel to the folding axis, and the first width is greater than a sum of a slip distance of the display and a width of the first sensor.
11. An electronic device comprising:
a housing comprising a first face and a second face facing the first face to construct a space;

a sensor circuitry disposed to the space and including a first sensor facing the first face;
a display disposed on the sensor circuitry;
a display drive integrated circuit (DDI) electrically coupled to the display; and
a protective sheet disposed between the sensor circuitry and the display and constructing a first opening comprising a region overlapping the sensor circuitry at a location corresponding to the first sensor of the sensor circuitry,
wherein the first opening has a first width in a direction parallel to an edge of the display to which the DDI is disposed and a second width in a direction perpendicular to the edge of the display to which the DDI is disposed, and the first width is greater than the second width, and
wherein the housing comprises two long edges facing each other and two short edges facing each other,
wherein the first opening has a first width in a direction parallel to a short edge of the two short edges and a second width in a direction parallel to a long edge of the two long edges, and
wherein a ratio of the first width with respect to a width of the first sensor in a direction substantially parallel to the first width is greater than a ratio of the second width with respect to a width of the first sensor in a direction substantially parallel to the second width.

12. The electronic device of claim 11, wherein the sensor circuitry comprises a second sensor, and the protective sheet further comprises a second opening corresponding to the second sensor.

13. The electronic device of claim 12, wherein the first opening and the second opening are disposed to be spaced apart.

14. The electronic device of claim 12, wherein the first sensor is disposed adjacent to an edge of the first opening to the second sensor, and the second sensor is disposed adjacent to an edge of the second opening to the first sensor.

15. The electronic device of claim 12, wherein the first sensor is a light emitting circuitry, and the second sensor is a light receiving circuitry.

16. The electronic device of claim 11, wherein the sensor circuitry is not visible by being covered by the display, when viewed from the outside.

17. An electronic device comprising:
a housing comprising a first face and a second face facing the first face to construct a space;
a sensor disposed to the space and facing the first face;
a display disposed on the sensor and comprising a first align mark for the disposition; and
a protective sheet disposed between the sensor and the display and constructing a first opening comprising a region overlapping the sensor at a location corresponding to the sensor,
wherein the first opening has a first width in a direction parallel to an edge where the first align mark of the display is located and a second width in a direction perpendicular to the edge where the first align mark is located, and the first width is greater than the second width.

18. The electronic device of claim 17, wherein a ratio of the first width with respect to a width of the sensor parallel to the first width is greater than a ratio of the second width with respect to a width of the sensor parallel to the second width.

* * * * *